United States Patent [19]

Piereder

[11] Patent Number: 4,582,103
[45] Date of Patent: Apr. 15, 1986

[54] PRODUCT DISPENSING APPARATUS

[76] Inventor: Ludwig Piereder, Squire Ct., R.R. #1, Waterloo, Ontario, Canada, N2J 4G8

[21] Appl. No.: 539,573

[22] Filed: Oct. 6, 1983

[51] Int. Cl.⁴ ............................................. B65B 39/12
[52] U.S. Cl. .................................... 141/238; 141/182; 141/371
[58] Field of Search ................. 141/88, 106, 182, 183, 141/186, 238, 258, 260, 167, 371; 222/108, 109, 366

[56] References Cited

U.S. PATENT DOCUMENTS 17,402    5/1857   Whitehead ........................... 222/108
2,965,141 12/1960  Höyer .................................. 141/258 X
3,626,997 12/1971  Whitaker et al. .................... 141/258 X
4,469,144  9/1984  Burns .................................. 141/86 X Primary Examiner—Stephen Marcus
Assistant Examiner—Mark Thronson
Attorney, Agent, or Firm—Kenneth M. Garrett

[57] ABSTRACT

Apparatus for dispensing product such as meat into packaging therefor comprises a portioning cell movable between a first station wherein it is charged with product and a second station wherein it locates above the packaging. A funnel is associated with the second station, and is mounted for vertical movement so as to locate the discharge opening of the funnel below the level of the upper perimeter of the packaging when the portioning cell is at the second station, and to raise the funnel thereafter so as to permit the passage of the packaging. A gutter is provided adjacent the second station for intercepting fluid leakage from the portioning cell.

10 Claims, 3 Drawing Figures

PRODUCT DISPENSING APPARATUS

FIELD OF INVENTION

This invention relates to apparatus for dispensing product into packaging therefor. It particularly relates to and is described in regard to apparatus for dispensing measured amounts of meat, especially whole muscle meat, although it is not necessarily limited thereto.

BACKGROUND OF INVENTION

Whole muscle meat for packaging is generally worked mechanically so as to mollify it, following which it is hermetically sealed in packaging for distribution. Often the meat may be required to be cooked, or part cooked, subsequent to it being packaged. Traditionally the packaging has been in the form of metal cans, and a hermetic seal has been obtained mechanically by roll seaming a lid onto the body of the can, possibly with a gasket interposed therebetween. Latterly, increasing use is being made of film packaging wherein a flange film receptacle is filled with the product, and a film cover is fusion welded to the flange to seal the receptacle. Typically the receptacles are vacuum formed in a continuous web of film, from which they are severed only subsequent to being filled and sealed. In at least one known type of packing machine, pairs of receptacles are transversely formed in the web.

The mollification of the meat tends to express natural juices therefrom. Liquid may well be added to the meat containing seasoning, gelatin or other additives. It is found that when using known types of meat dispensing apparatus for filling the receptacles, appreciable splashing of juices onto the web of the film may occur, whereby the package cannot be hermetically sealed without suitably cleansing the web.

It is then a primary object of this invention to provide product dispensing apparatus that reduces the incidence of splashing at the filling station.

It is another object of this invention to provide product dispensing apparatus that may be used for filling more than one package simultaneously.

SUMMARY OF THE INVENTION

In accordance with my invention, meat dispensing apparatus comprises a meat portioning cell having an opening in the bottom thereof through which meat may be charged to and discharged from the portioning cell. The portioning cell is mounted on a plate like member, which in turn is mounted on a second plate like member having an opening therethrough, to which opening a conduit is connected on the underside of the plate for supplying meat for packaging to the apparatus. The first plate is slidable on the second plate; by slidable it should be understood that elements may be interposed between the plate surfaces to reduce friction therebetween and also to increase the sealing action therebetween such as may be desired. A motor, preferably in the form of a linear, fluid operated motor, is operatively connected to move the first plate between a first station, wherein the opening in the portioning cell is connected in flow relationship to the conduit for charging the cell, and a second station, wherein the opening is disposed vertically above a path along which the receptacles will travel for filling. A funnel is associated with the second station, and is mounted for reciprocal vertical movement, such movement being procured through the use of a motor, which may expediently be of similar type to the motor for driving the support plate. In operation of the apparatus the height of the funnel above the receptacle to be filled may be varied, whereby during discharge of the contents of the portioning cell into the receptacle, the discharge opening of the funnel locates below the upper perimeter of the receptacle; when the contents of the portioning cell are discharged, the funnel is raised so as to not interfere with the passage of the receptacle.

In accordance with another aspect of the invention, a gutter locates beneath the leading edge of the second support plate defining the second station, so as to capture liquid that may adventitiously escape from the portioning cell in its passage towards the second station.

In accordance with yet another aspect of the invention, the apparatus may have a general axial plane of symmetry, having left and right portioning cells and left and right funnels ganged together for simultaneous operation.

These foregoing objects, aspects and advantages, and other objects, aspects and advantages of my invention will become more clear from the accompanying description of the preferred embodiment of the invention.

DESCRIPTION OF THE PREFERRED EMBODIMENT

Figure 1:
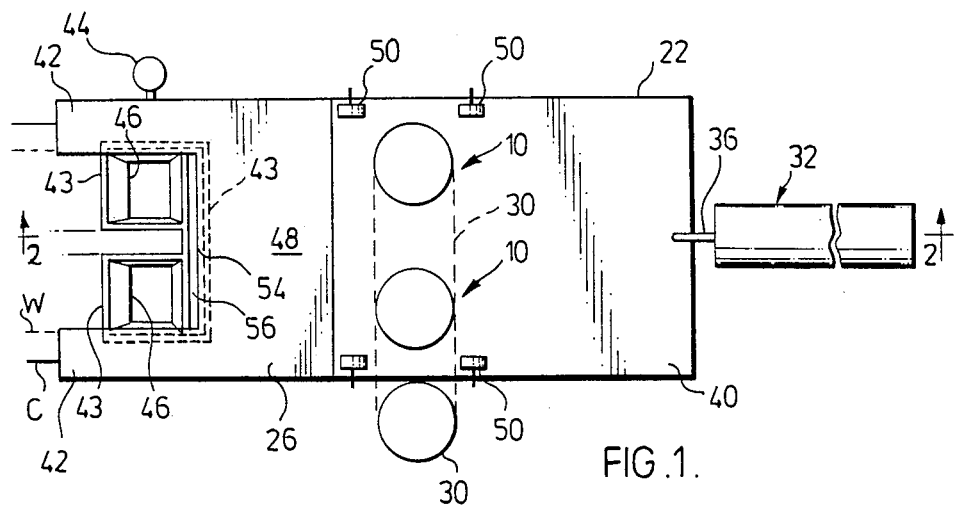
FIG. 1 is a schematic plan view from above of the apparatus, also showing in part a portion of a packaging machine, with the portioning cell located in its charging position.
Figure 2:
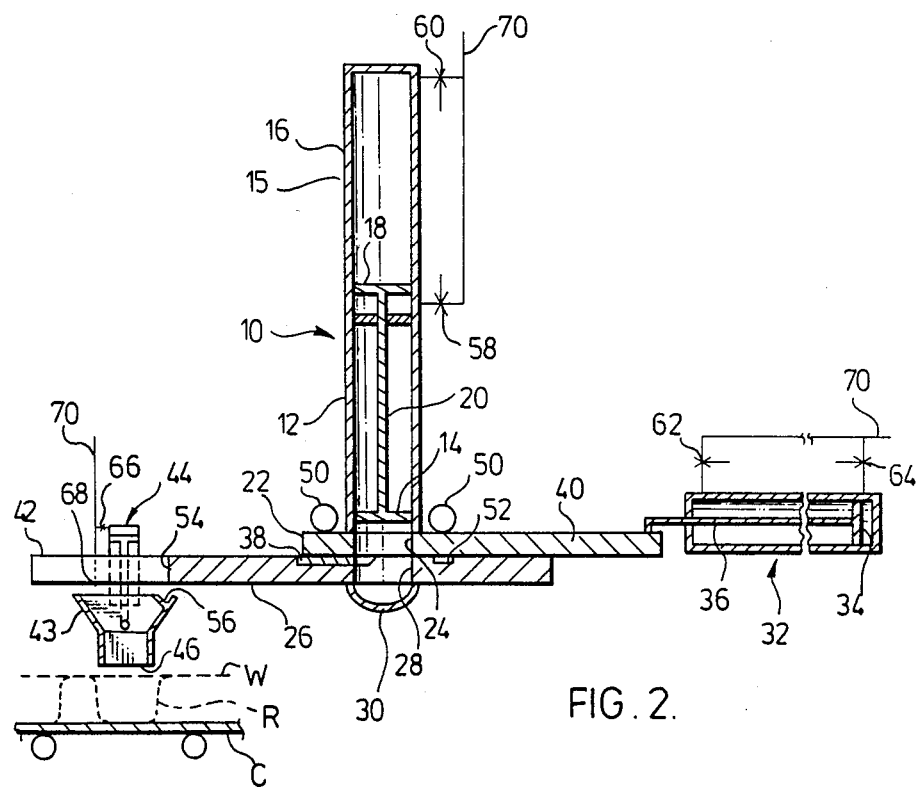
FIG. 2 is a section along 2—2 of FIG. 1.
Figure 3:
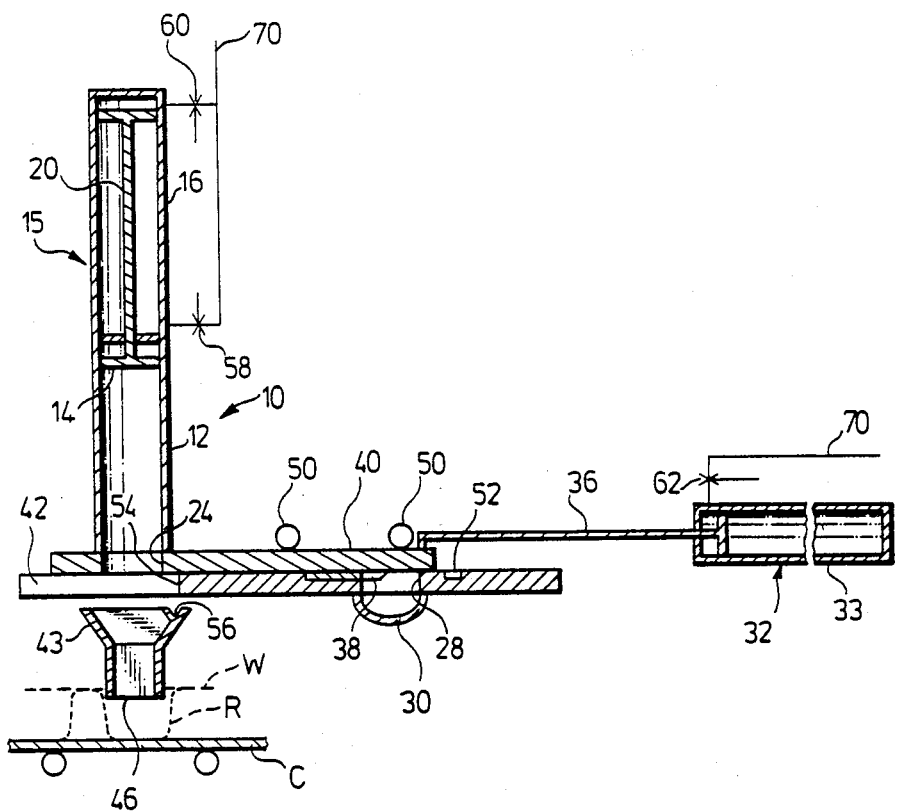
FIG. 3 is similar to FIG. 2, but shows the apparatus moved to its position for discharging the portioning cell.

Referring to the drawings in detail, a meat dispensing apparatus in accordance with this embodiment will be seen from FIG. 1 to have a general axial plane of symmetry, and only those elements on one lateral side of the apparatus will be specifically referred to, unless otherwise necessitated. The terms "left" and "right" may be employed hereafter to differentiate otherwise identical components. The apparatus comprises a portioning cell 10, which may be of the type more particularly described in my U.S. Pat. No. 4,188,767. Portioning cell 10 comprises a cylinder 12 having a ram 14 therein and a motor 15 comprising cylinder 16, a piston 18 and a connecting rod 20 interconnecting the piston and ram. Expediently cylinders 12 and 16 are unitarily formed.

Portioning cell 10 is mounted from the upper side of a support plate 22 having an opening 24 therein in communication with the interior of the portioning cell. Plate 22 is supported from an underlaying plate 26 which is fixed relative to the frame of the apparatus and which has an opening 28 therein. A conduit 30 is sealed to the underside of plate 26 in communication with opening 28, serving to supply meat thereto, for example, from a meat pump (not shown), for example of the type more particularly described in my U.S. Pat. No. 4,060,349. Conveniently a single conduit 30 may connect to both left and right openings 28. The location of portioning cell 10 when in communication with conduit 30 may be referred to as the first station.

Plate 22 is slidable on plate 26, being movable along an axial path to a second station wherein the contents of portioning cell 10 is dischargable into packaging therefor. A conveyor C forming part of a known packaging apparatus and with which the instant apparatus may be employed locates beneath the second station and moves in an axial direction. Receptacles R are supported thereon, and are interconnected by a web W. Typically receptacles R are vacuum formed from a thermoplastic film. As a later part of the packaging operation, a closure is sealed to web W and the individual receptacles then severed from the web.

A motor 32 comprising a pneumatic cylinder 33 and a piston 34 which connects through connecting rod 36 to plate 22 is provided for moving portioning cell 10 between the first and second stations. A knife 38 is inlayed in the upper surface of plate 26, the cutting edge of the knife in plan being semi-circular having a major chord generally coincident with and coextensive with the transverse major chord of cylinder 12, whereby movement of the portioning cell towards the second station serves to sever portions of meat that bridge between the conduit 30 and the portioning cell. A separately operable knife may be provided for this purpose if desired. The trailing portion 40 of plate 22 is of sufficient axial extent that when portioning cell 10 locates at the second station, conduit 30 remains covered, if only for purposes of hygiene. The leading portion of plate 26 comprises a pair of arms 42 located on each side of the second station for supporting plate 22 when it locates at the second station.

In practice, it is difficult to arrange for the close approach of web W to the underside of plate 26, and the height of the discharge opening of portioning cell 10 above the receptacle may well be in the range of 30 to 50 cms. In order to reduce the amount of splashing that may occur, I provide a funnel 43 at the second station. Funnel 43 is mounted for reciprocal vertical movement from pneumatic drive motors 44 similar in nature to motor 32 and which locate on each lateral side of the apparatus. Funnel 43 comprises left and right funnel elements ganged together for simultaneous operation. The outlet 46 of a funnel is arranged to be somewhat smaller than the opening to a receptacle R, whereby the funnel may be lowered such that the outlet opening is a little below the horizontal level of web W at the time of discharging the contents of a portioning cell into a receptacle. When the discharge is complete, the funnel 43 is raised whereby the funnel outlet 46 is above the level of web W, to permit the receptacles R to be advanced and present a further pair of receptacles beneath the second station for filling. Where the receptacles R are profound it may be advantageous to lower the funnel 43 to a greater degree, and to commence raising it before the contents of portioning cell 10 is completely discharged.

The web 48 of plate 26, which is to say those portions of the plate over which the outlet openings of the left and right portioning cells pass along their path from the first to the second stations, is imperforate so as to form a seal for the portioning cells. The seal is enhanced by such expedients as guide rollers 50 which exert a clamping force between the two plates, and by gaskets 52 interposed between the mating surfaces. Nonetheless, some leakage occurs, and this tends to be swept towards the second station by plate 22, where it drips from leading edge 54 terminating web 48. In order to prevent this liquid from falling either onto web W, or into receptacles R, I provide a gutter 56 located beneath edge 54. Conveniently gutter 56 is integrally formed with funnels 42, although it should be remarked that the gutter bridges without interruption between arms 43.

Valve means 58, 60, 62, 64, 66 and 68 is shown for actuating motors 15, 32 and 44 from a pneumatic supply line 70. While no specific control means is shown for the operation of the valve means, it will be understood that automatic control means will expediently be employed as is common in this type of apparatus, and that it will be interlinked in operation with other machinery with which the apparatus is normally employed, such as the meat pump and the packaging machine spoken of.

It will also be apparent that many modifications of the above described illustrative embodiment of the invention may be made, some of which may be more or less preferred according to particular circumstances.

I claim:

1. A product dispensing apparatus for use with a packaging machine in which receptacles for said product are conveyed, along a path for filling by said dispensing apparatus, each said receptacle having an upper perimeter defining an opening therein, said product dispensing apparatus comprising:

a first support member having an opening therethrough;

a conduit sealed to the underside of said support member in flow relation with said opening;

a second support member;

a portioning cell, with an opening therein, mounted on said second support member, said second support member having an opening therein for charging and discharging product to said portioning cell;

said first and second support members being relatively movable along a path between a first station wherein said portioning cell and said conduit are in flow communication and a second station horizontally spaced from said first station and wherein said opening in said portioning cell locates generally vertically above said path on which said receptacles move for filling;

motor means for procuring said relative movement;

funnel means, having a discharge opening, associated with said second station for directing said product discharged from said portioning cell into a said receptacle;

means mounting said funnel means for vertical movement whereby the discharge opening thereof may locate alternately at a level below and above said upper perimeter of said receptacle, and motor means for procuring said vertical movement;

wherein said first and second support members comprise horizontally disposed plates the one slidable on the other;

and wherein said path between said first and second stations is rectilinear.

2. Apparatus as defined in claim 1, wherein a knife is inlaid in the first support member to partially surround said opening in said first support member.

3. Apparatus as claimed in claim 1, wherein means are provided to exert a clamping pressure between said first and second support members.

4. Apparatus as defined in claim 1, having a general axial plane of symmetry, and wherein there are disposed a pair of said portioning cells on said second support.

5. Apparatus as defined in claim 4, wherein a single conduit is provided which connects to both said portioning cells when located at said first station.

6. Apparatus as defined in claim 4, wherein said funnel means comprises left and right funnel members ganged together.

7. Apparatus as claimed in claim 1, wherein said second support member acts to close said conduit when said portioning cell moves towards said second station.

8. Apparatus as claimed in claim 1 wherein said first support member acts to close said opening in said portioning cell as said portioning cell moves towards said second station.

9. A product dispensing apparatus for use with a packaging machine in which receptacles for said product are conveyed, along a path for filling by said dispensing apparatus, each said receptacle having an upper perimeter defining an opening therein, said product dispensing apparatus comprising:

a first support member having an opening therethrough;

a conduit sealed to the underside of said support member in flow relation with said opening;

a second support member;

a portioning cell, with an opening therein, mounted on said second support member, said second support member having an opening therein for charging and discharging product to said portioning cell;

said first and second support members being relatively movable along a path between a first station wherein said portioning cell and said conduit are in flow communication and a second station horizontally spaced from said first station and wherein said opening in said portioning cell locates generally vertically above said path on which said receptacles move for filling;

motor means for procuring said relative movement;

funnel means, having a discharge opening, associated with said second station for directing said product discharged from said portioning cell into a said receptacle;

means mounting said funnel means for vertical movement whereby the discharge opening thereof may locate alternately at a level below and above said upper perimeter of said receptacle, and motor means for procuring said vertical movement;

wherein said first and second support members comprise horizontally disposed plates the one slidable on the other;

wherein said path between said first and second stations is rectilinear;

wherein said first support member has a leading edge which defines said second station and further comprising a gutter locating beneath said leading edge of said first support member.

10. Apparatus as defined in claim 9, wherein said funnel means comprises a first wall disposed closest to said conduit and a second wall spaced from said first wall, and the gutter mounts from said first wall of said funnel.

* * * * *